US009483463B2

(12) United States Patent
Galle et al.

(10) Patent No.: US 9,483,463 B2
(45) Date of Patent: Nov. 1, 2016

(54) METHOD AND SYSTEM FOR MOTIF EXTRACTION IN ELECTRONIC DOCUMENTS

(75) Inventors: Matthias Galle, St-Martin d'Heres (FR); Jean-Michel Renders, Quaix en Chartreuse (FR)

(73) Assignee: Xerox Corporation, Norwalk, CT (US)

( * ) Notice: Subject to any disclaimer, the term of this patent is extended or adjusted under 35 U.S.C. 154(b) by 587 days.

(21) Appl. No.: 13/608,312

(22) Filed: Sep. 10, 2012

(65) Prior Publication Data

US 2014/0074455 A1    Mar. 13, 2014

(51) Int. Cl.

| G10L 15/22 | (2006.01) |
| G10L 15/187 | (2013.01) |
| G06Q 30/04 | (2012.01) |
| G06Q 30/02 | (2012.01) |
| G06Q 40/00 | (2012.01) |
| G06F 17/27 | (2006.01) |
| G06F 17/24 | (2006.01) |
| G06F 19/18 | (2011.01) |
| G06F 19/22 | (2011.01) |
| G06F 7/24 | (2006.01) |

(52) U.S. Cl.
CPC ......... G06F 17/2775 (2013.01); G06F 17/248 (2013.01)

(58) Field of Classification Search
CPC ................ G06F 17/2785; G06F 17/30864; G06F 17/2247; G06F 17/30616; G06F 17/30539; G06F 17/24; G06F 17/30873; G10L 15/265; G10L 15/22; G10L 15/187; H04L 29/08072
USPC ............... 702/19, 20; 704/9, 235, 257, 254; 707/709, 755, 738, 776; 715/234, 255, 715/742; 709/203, 219, 224
See application file for complete search history.

(56) References Cited

U.S. PATENT DOCUMENTS

| 5,845,049 | A | * | 12/1998 | Wu | ......................... 706/20 |
| 6,092,038 | A | * | 7/2000 | Kanevsky | ............... H03M 7/30 704/257 |
| 6,385,579 | B1 | * | 5/2002 | Padmanabhan | ....... G10L 15/063 704/243 |
| 6,618,725 | B1 | * | 9/2003 | Fukuda | ............. G06F 17/30719 |
| 6,745,130 | B2 | * | 6/2004 | Kawanishi et al. | ............ 702/20 |
| 7,203,725 | B1 | * | 4/2007 | Gilmour | ............ G06F 17/30613 707/999.003 |
| 7,555,428 | B1 | * | 6/2009 | Franz | ................... G06F 17/277 704/10 |
| 8,117,085 | B1 | * | 2/2012 | Smith | ................ G06Q 30/0629 705/26.7 |
| 8,359,326 | B1 | * | 1/2013 | Garg | ................. G06F 17/30864 707/705 |

(Continued)

OTHER PUBLICATIONS

Simon J Puglisi, William F Smyth, and Munina Yusufu. Fast practical algorithms for computing all the repeats in a string. In Jan Holub and Jan Zdarek, editors, Prague Stringology Conference, pp. 161-169, 2008.

(Continued)

Primary Examiner — Pierre-Louis Desir
Assistant Examiner — Anne Thomas-Homescu
(74) Attorney, Agent, or Firm — Jones Robb, PLLC

(57) ABSTRACT

A method, system, and computer program product for extracting text motifs from the electronic documents is disclosed. A user provides a largest-maximal repeat or a super-maximal repeat as a first text block. The occurrences of the first text block are detected to identify the second text blocks in the vicinity of the occurrences of the first text block on the basis of pre-defined parameters. The text motifs are determined by combining the first text block and the second text block. Finally, the text motifs are extracted from the electronic documents.

13 Claims, 5 Drawing Sheets

(56) References Cited

U.S. PATENT DOCUMENTS

| | | | |
|---|---|---|---|
| 8,972,242 B2* | 3/2015 | Hao | 704/251 |
| 2005/0071333 A1* | 3/2005 | Mayfield | G06F 17/30731 |
| 2005/0187932 A1* | 8/2005 | Kanayama | G06F 17/2785 |
| 2006/0259250 A1* | 11/2006 | Schwartz | 702/20 |
| 2007/0050411 A1* | 3/2007 | Hull et al. | 707/104.1 |
| 2007/0050712 A1* | 3/2007 | Hull et al. | 715/530 |
| 2007/0174267 A1* | 7/2007 | Patterson | G06F 17/30687 |
| 2008/0027934 A1* | 1/2008 | Duxbury | 707/6 |
| 2008/0154964 A1* | 6/2008 | Matsuyama et al. | 707/104.1 |
| 2008/0228769 A1* | 9/2008 | Lita | G06F 19/345 |
| 2009/0094233 A1* | 4/2009 | Marvit | G06F 17/3071 |
| 2009/0157648 A1* | 6/2009 | King | G06F 17/277 |
| 2009/0204609 A1* | 8/2009 | Labrou | G06F 17/3064 |
| 2010/0185397 A1* | 7/2010 | Akitomi | 702/19 |
| 2011/0119209 A1* | 5/2011 | Kirshenbaum | G06N 5/02 706/12 |
| 2011/0282888 A1* | 11/2011 | Koperski | G06F 17/30864 707/752 |
| 2012/0011109 A1* | 1/2012 | Ambwani | G06F 17/30029 707/722 |
| 2012/0053927 A1* | 3/2012 | Kulkarni | G06F 17/30884 704/9 |
| 2012/0191585 A1* | 7/2012 | Lefebvre et al. | 705/35 |
| 2012/0203584 A1* | 8/2012 | Mishor | G06Q 30/02 705/7.11 |
| 2012/0296891 A1* | 11/2012 | Rangan | G06F 17/3069 707/722 |
| 2012/0323932 A1* | 12/2012 | Xin | G06F 17/30734 707/749 |
| 2013/0036124 A1* | 2/2013 | Ambwani | G06F 17/30796 707/749 |
| 2013/0054578 A1* | 2/2013 | Satoh | 707/722 |
| 2014/0378537 A1* | 12/2014 | Glasmacher et al. | 514/44 R |

OTHER PUBLICATIONS

Nadia Pisanti, Maxime Crochemore, Roberto Grossi, and Marie-France Sagot. Bases of motifs for generating repeated patterns with wild cards. IEEE/ACM. Transactions on Computational Biology and Bioinformatics, 2(1), 2005.

Alberto Apostolico, Matteo Comin, and Laxmi Parida. VARUN: Discovering extensible motifs under saturation constraints. IEEE/ACM Transactions on Computational Biology and Bioinformatics, 99, 2008.

N. Pisanti, A. M. Carvalho, L. Marsan, and M.-F. Sagot. Risotto: Fast extraction of motifs with mismatches. In J. R. Correa, A. Hevia, and M. Kiwi, editors, Proceedings of the 7th Latin American Theoretical Informatics Symposium, vol. 3887 of Lecture Notes in Computer Science, pp. 757-768. Spriger-Verlag, 2006.

Yongqiang Zhang and Mohammed Zaki. Exmotif: efficient structured motif extraction. Algorithms for Molecular Biology, 1(1):21, 2006.

Christine Rousseau, Mathieu Gonnet, Marc Le Romancer, and Jacques Nicolas. CRISPI: a CRISPR interactive database. Bioinformatics, 25(24), 2009.

Roberto Grossi, Andrea Pietracaprina, Nadia Pisanti, Geppino Pucci, Eli Upfal, and Fabio Vandin. MADMX: A novel strategy for maximal dense motif extraction. In Workshop on Algorithms in Bioinformatics, pp. 362-374, 2009.

Jacques Nicolas, Christine Rousseau, Anne Siegel, Pierre Siegel, Francois Coste, Patrick Durand, Sebastien Tempel, Anne-Sophie Valin, and Frederic Mahe. Modeling local repeats on genomic sequences. Technical report, INRIA, 2008.

C.S.Iliopoulos, J.McHugh, P.Peterlongo, N.Pisanti, W.Rytter, and M.Sagot. A first approach to finding common motifs with gaps. International Journal of Foundation of Computer Science, 16(6):1145-1155, 2005.

\* cited by examiner

METHOD AND SYSTEM FOR MOTIF EXTRACTION IN ELECTRONIC DOCUMENTS

TECHNICAL FIELD

The presently disclosed embodiments are related to the system and method for extracting motifs. More particularly, the presently disclosed embodiments are related to the system and method for extracting text motifs in electronic documents.

BACKGROUND

An electronic document refers to a file in an electronic medium that includes text portions. Some examples of electronic documents may include, but are not limited to, emails, news articles, journals, web pages, or any electronic document containing text. In certain scenarios, the electronic document may include text that may not provide much semantic information compared to the semantic information in the main content of the electronic document. For example, emails may include digital signatures, disclaimer notices, disclosures, headers/footers, or pre-defined text in templates that are semantically irrelevant. At times, it may be desirable to remove such irrelevant portions from the electronic document to enhance its readability.

SUMMARY

According to embodiments illustrated herein, there is provided a method for extracting one or more text motifs from one or more electronic documents. The method is implementable on a computing device. The method includes receiving a first text block from a user, wherein the first text block corresponds to at least one of a largest-maximal repeat (LMR) or a super-maximal repeat (SMR). One or more occurrences of the first text block are detected from the one or more electronic documents. Thereafter, one or more second text blocks in vicinity of each of the one or more occurrences of the first text block is identified based on a pre-defined set of parameters, such that at least one of the one or more second text blocks is repeated at least two times in the one or more electronic documents. Additionally, the one or more text motifs in the one or more electronic documents is determined, in which each of the one or more text motifs is a combination of the first text block and at least one of the one or more second text blocks. Finally, the one or more text motif is extracted from each of the one or more electronic documents.

According to embodiments illustrated herein, there is provided a method for removing boilerplate text in one or more electronic documents. The method is implementable on a computing device. The method includes receiving a first text block from a user, wherein the first text block corresponds to at least one of a largest-maximal repeat (LMR) or a super-maximal repeat (SMR). One or more occurrences of the first text block are detected from the one or more electronic documents. Thereafter, one or more second text blocks in vicinity of each of the one or more occurrences of the first text block is identified based on a pre-defined set of parameters, such that at least one of the one or more second text blocks is repeated at least two times in the one or more electronic documents. Additionally, the one or more text motif in the one or more electronic documents is determined, in which each of the one or more text motif is a combination of the first text block and at least one of the one or more second text blocks. Finally, the one or more text motif is removed from each of the one or more electronic documents.

According to embodiments illustrated herein, there is provided a system for extracting one or motifs from one or more electronic documents. The system includes a detection module, an identification module, a motif determination module, and a motif extraction module. The detection module is configured to detect one or more occurrences of a first text block in the one or more electronic documents, wherein the first text block corresponds to at least one of a largest-maximal repeat (LMR) or a super-maximal repeat (SMR). The identification module is configured to identify one or more second text blocks in vicinity of each of the one or more occurrences of the first text block based on a maximum length of a gap between the first text block and the second text block such that at least one of the one or more second text blocks is repeated at least two times in the one or more electronic documents. The motif determination module is configured to determine the one or more text motifs in the one or more electronic documents, wherein each of the one or more text motifs is a combination of the first text block and at least one of the one or more second text blocks. The motif extraction module is configured to extract the one or more text motifs from each of the one or more electronic documents.

BRIEF DESCRIPTION OF DRAWINGS

The accompanying drawings illustrate various embodiments of systems, methods, and other aspects of the invention. Any person having ordinary skills in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit, the scope in any manner, wherein like designations denote similar elements, and in which.

DETAILED DESCRIPTION

Figure 1:
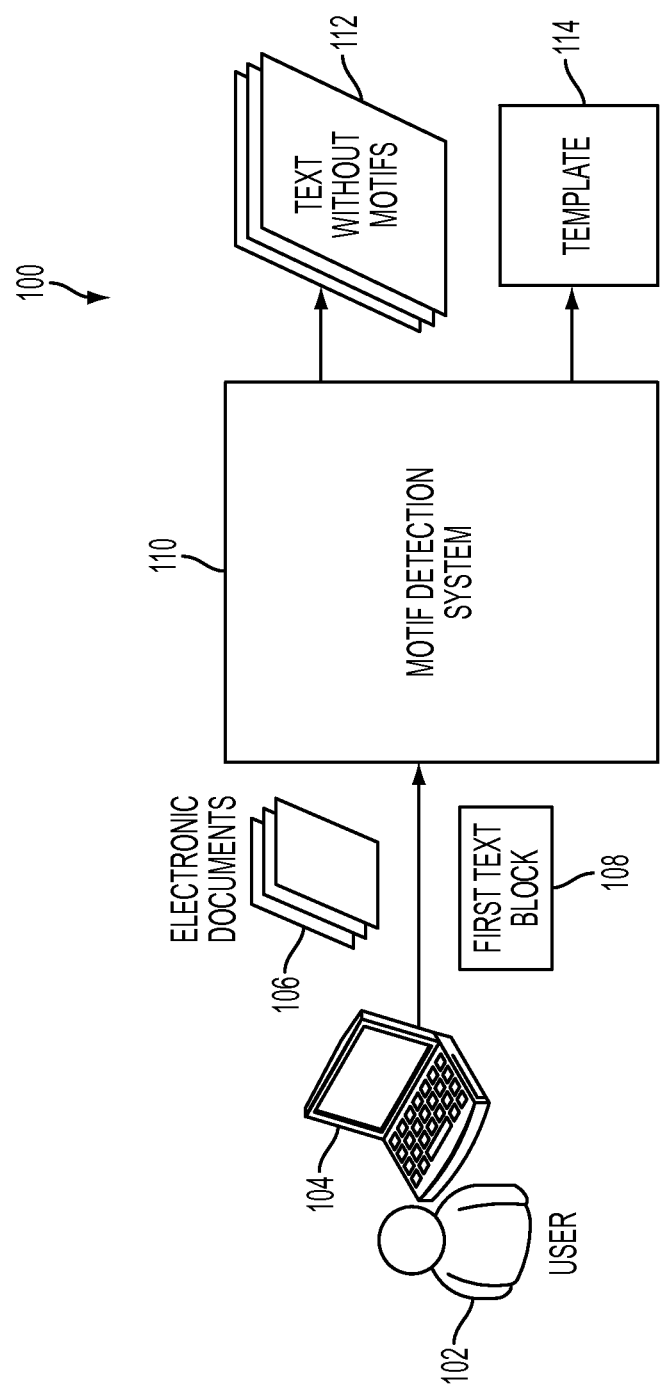
FIG. 1 is a block diagram illustrating an environment for motif detection, in which various embodiments can be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as methods and systems may extend beyond the described embodiments. For example, the teachings presented and the needs of a particular application may yield multiple alternate and suitable approaches to implement functionality of any detail described herein. Therefore, any approach may extend beyond the particular implementation choices in the following embodiments described and shown.

References to "one embodiment", "an embodiment", "one example", "an example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions: The following terms shall have, for the purposes of this application, the respective meanings set forth below.

A "text block" refers to a set of words grouped together as an entity.

An "electronic document" refers to a file, in an electronic form, that includes text portions. Examples of the electronic document may include, but are not limited to, emails, news articles, journals, or web pages. Further, the format of the electronic document may include, but is not limited to, .doc, .docx, .ppt, .pptx, or .pdf. In an embodiment, the electronic document may include a text portion, an images portion, and/or both.

A "repeat" refers to a sequence of symbols or words that occur at least two times in the electronic document.

A "left-context" of a repeat refers to a set of symbols or words before the repeat, i.e., to the left of the repeat.

A "right-context" of a repeat refers to a set of symbols or words after the repeat, i.e., to the right of the repeat.

A "largest-maximal repeat" (LMR) refers to a set of repeats with at least one occurrence right and left-context unique. In an embodiment, the LMR is represented by the following mathematical expression:

$$\text{LMR}(s) = \{r \in R(s) : \exists o \in \text{pos}_s(r) : \text{lcu}_s(r, o) \wedge \text{rcu}_s(r, o)\}, \quad (1)$$

where, s=first sequence that is a concatenation of symbols s[1] . . . s[n], where s[i] is an alphabet;

r=second sequence occurring in s at position k if r[i]=s[k+i] for i=1 . . . |r|;

R(s)=set of all repeats of s;

$\text{pos}_s(r)$=set of occurrences of r in s;

o=occurrence of r;

$\text{lcu}_s(r, o)$=left-context unique occurrence of r (only one occurrence with this left-context); and $\text{rcu}_s(r, o)$=right-context unique occurrence of r (only one occurrence with this right-context).

A "super-maximal repeat" (SMR) refers to a set of repeats with all its occurrences left and right-context unique. The SMR can be defined by looking at the set of repeats alone without the need of referring to their occurrences. In an embodiment, SMR corresponds to a repeat that is not a substring of any other repeat in the one or more electronic documents. In an embodiment, the SMR is represented by the following mathematical expression:

$$\text{SMR}(s) = \{r \in R(s) \forall o \in \text{pos}_s(r) : \text{lcu}_s(r, o) \wedge \text{rcu}_s(r, o)\}, \quad (2)$$

A "maximal repeat" (MR) refers to a set of repeats that are left and right-context diverse. The MR is a repeat that cannot be extended to its left or right without losing any occurrence. In an embodiment, the mathematical expression for MR is given by:

$$\text{MR}(s) = \{r \in R(s) : \text{lcd}_s(r, \text{pos}_s(r)) \wedge \text{rcd}_s(r, \text{pos}_s(r))\}, \quad (3)$$

where, $\text{lcd}_s(r, p)$=For a given r, subset $p \subseteq \text{pos}_s(r)$ is left-context diverse (if $\text{lc}_s(r, p) \geq 2$); and $\text{lc}_s(r, p)$=left-context of a repeat r in s for a subset of its occurrences p.

A "text motif" refers to one or more text blocks that occur repeatedly in the electronic document. In an embodiment, the text motif satisfies one or more of a set of pre-defined parameters defined by a user. The user based on the application area and individual interest defines the set of pre-defined parameters.

A "pre-defined set of parameters" refers to at least one of the minimum length of the text block, minimum length of a text motif, minimum number of occurrences of the text motif, maximum length of a gap between the first text block and the second text block, and maximum number of text blocks in the text motif.

A "first text block" refers to a starting block, provided by the user as a starting point to begin the process of motif detection in the electronic documents.

An "array of repeats" refers to a pre-computed array that includes a list of repeats of text blocks at each position in the electronic documents.

A "diversity" of a repeat refers to the number of distinct electronic documents in which the repeat occurs.

FIG. 1 is a block diagram illustrating an environment 100, in which various embodiments can be implemented. The environment 100 includes a computing device 104 and a motif detection system 110. The environment 100 further includes one or more electronic documents 106, a first text block 108, a text without motifs 112, and a template 114.

In an embodiment, the computing device 104 refers to a computer, a device including a processor/microcontroller and/or any other electronic component, or a device or a system that performs one or more operations according to one or more programming instructions. Examples of the computing device 104 include, but are not limited to, a desktop computer, a laptop, a personal digital assistant (PDA), a smart phone, an MFD, a tablet computer (e.g., iPad®, Samsung Galaxy Tab®) and the likes. The computing device 104 provides information such as the one or more electronic documents 106, and the first text block 108 to the motif detection system 110. In an embodiment, a user 102 inputs the information on the computing device 104.

In an embodiment, the motif detection system 110 is integrated with the computing device 104. In an alternate embodiment, the motif detection system 110 is external to the computing device 104. The motif detection system 110 receives the one or more electronic documents 106, the first text block 108, and pre-defined set of parameters from the computing device 104. Thereafter, the motif detection system 110 identifies one or more text motifs in the one or more electronic documents 106, based on the first text block 108 and the pre-defined parameters. Depending on the one or more text motifs, the motif detection system 110 creates a file that includes the text without motifs 112. In an embodiment, the motif detection system 110 creates the template 114 based on the one or more text motifs.

Figure 2:
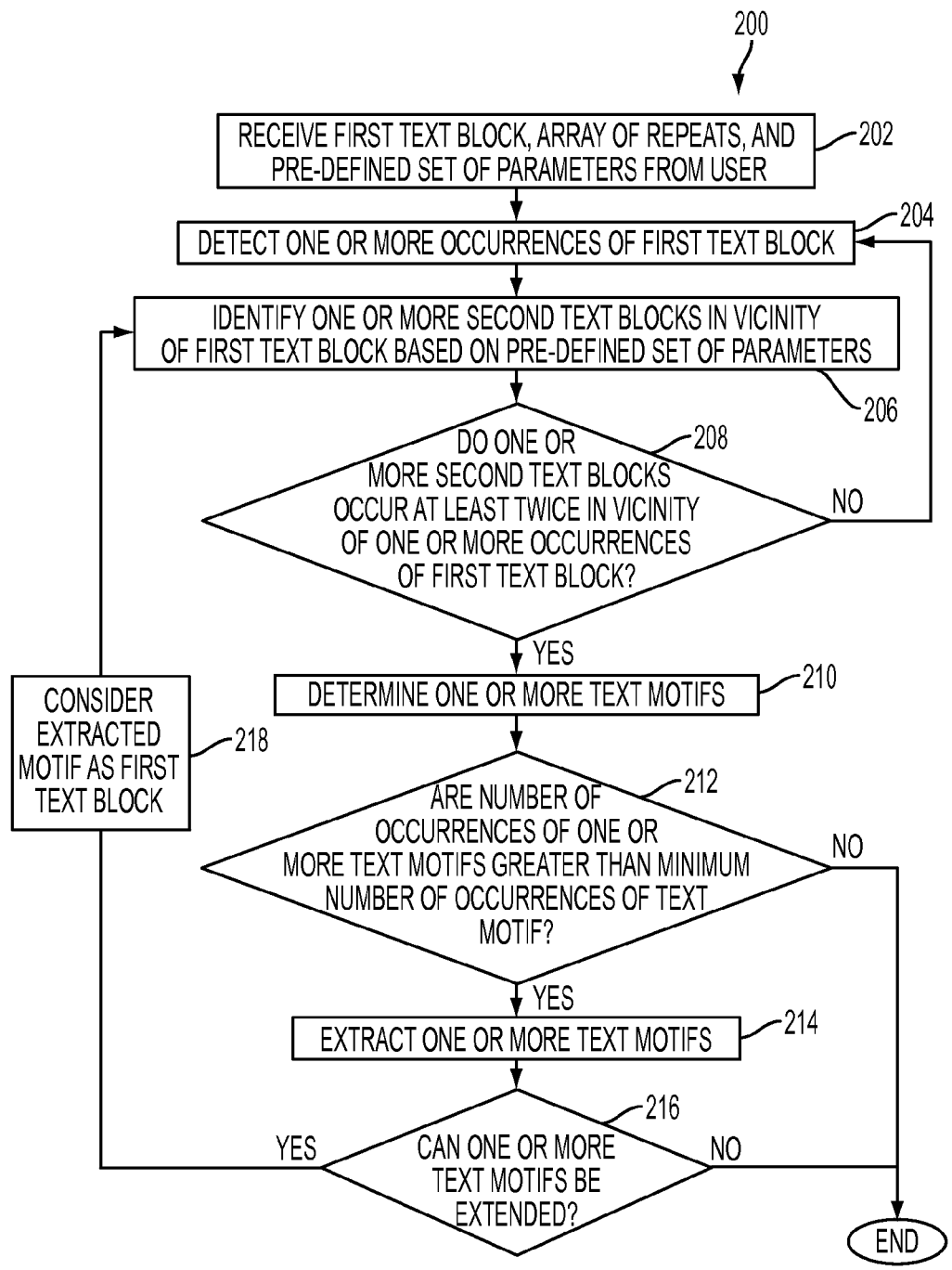
FIG. 2 is a flowchart illustrating a method for extracting motifs, in accordance with at least one embodiment.

FIG. 2 is a flowchart 200 illustrating a method for extracting motifs in accordance with at least one embodiment. FIG. 2 is explained in conjunction with FIG.

At step 202, the first text block 108, the array of repeats, and the pre-defined set of parameters is received from the user 102 via the computing device 104. In an embodiment, the motif detection system 110 receives the first text block 108, the array of repeats, and the pre-defined set of parameters. In an embodiment, the first text block 108 selected by the user 102 is an LMR. In another embodiment, the first text block 108 selected by the user 102 is an SMR. In yet another embodiment, the first text block 108 selected by the user 102 is an MR.

At step 204, the one or more occurrences of the first text block 108 in the one or more electronic documents 106 is detected. In an embodiment, the one or more occurrences of the first text block 108 are detected by the motif detection system 110. The motif detection system 110 searches for the first text block 108 in the array of repeats. Based on the search, the motif detection system 110 extracts corresponding positions of the occurrences of the first text block 108 from the array of repeats in the one or more electronic documents 106.

At step 206, one or more second text blocks in vicinity of the one or more occurrences of the first text block 108 is identified based on the pre-defined set of parameters. In an embodiment, the motif detection system 110 identifies the one or more second blocks. In an embodiment, the motif detection system 110 identifies a second block that is positioned at a distance less than the maximum length of a gap, hereinafter referred to as $\epsilon$, in terms of number of words or symbols, from the first text block 108. In an embodiment, the second text block may appear to the right of the first text block 108, within the distance $\epsilon$ from the first text block 108. In another embodiment, the second text block may appear to the left of the first text block 108, within the distance $\epsilon$ from the first text block 108. The identification of the second text block is described later in conjunction with FIG. 3a and FIG. 3b.

At step 208, a check is performed to ascertain whether the one or more second text blocks occur more than two times in the vicinity of the one or more occurrences of the first text block 108 in the one or more electronic documents 106. If at step 208, it is determined that the one or more second text blocks do not occur at least twice, the step 204 is repeated.

If at step 208, it is determined that the one or more second text blocks occurs more than two times in the vicinity of the one or more occurrences of the first text block 108, step 210 is performed.

At step 210, one or more text motifs are determined based on the one or more identified second blocks and the first text block 108. In an embodiment, the first text block 108 and the one or more second text blocks are combined to form the text motif. The mathematical expression for representing text motif is illustrated below.

$$m = B1 \, \Delta^{*\epsilon} B2, \quad (4)$$

where,

B1=first text block;
B2=second text block;
$\Delta$=joker or don't care symbol; and
$\epsilon$=maximum length of gap (in terms of number of words or symbols) between the first text block B1 and the second text block B2.

In an embodiment, the joker or don't care symbol corresponds to a text that is not of interest to the user 102.

At step 212, a check is performed to ascertain whether the number of occurrences of the one or more text motifs is greater than the minimum occurrences of the one or more text motifs in the electronic documents 106 (pre-defined by the user 102). The checking of the number of occurrences has been described later in conjunction with FIG. 3a and FIG. 3b.

At step 214, the one or more text motif is extracted from the one or more electronic documents 106 by the motif detection system 110. In an embodiment, the one or more text motifs that satisfy the criteria at step 212 are extracted.

At step 216, the one or more text motifs are checked for extension. The extension of the one or more text motifs is checked based on the maximum number of text blocks in each of the one or more text motifs (hereinafter referred as y). If the one or more text motifs can be extended based on y, step 218 is performed. At the step 218, the extracted motif is considered as the first text block 108 and the step 206 to 216 are repeated.

In an embodiment, steps 202 to 216 are performed for each of the first text block 108 provided by the user 102.

Figure 3A:
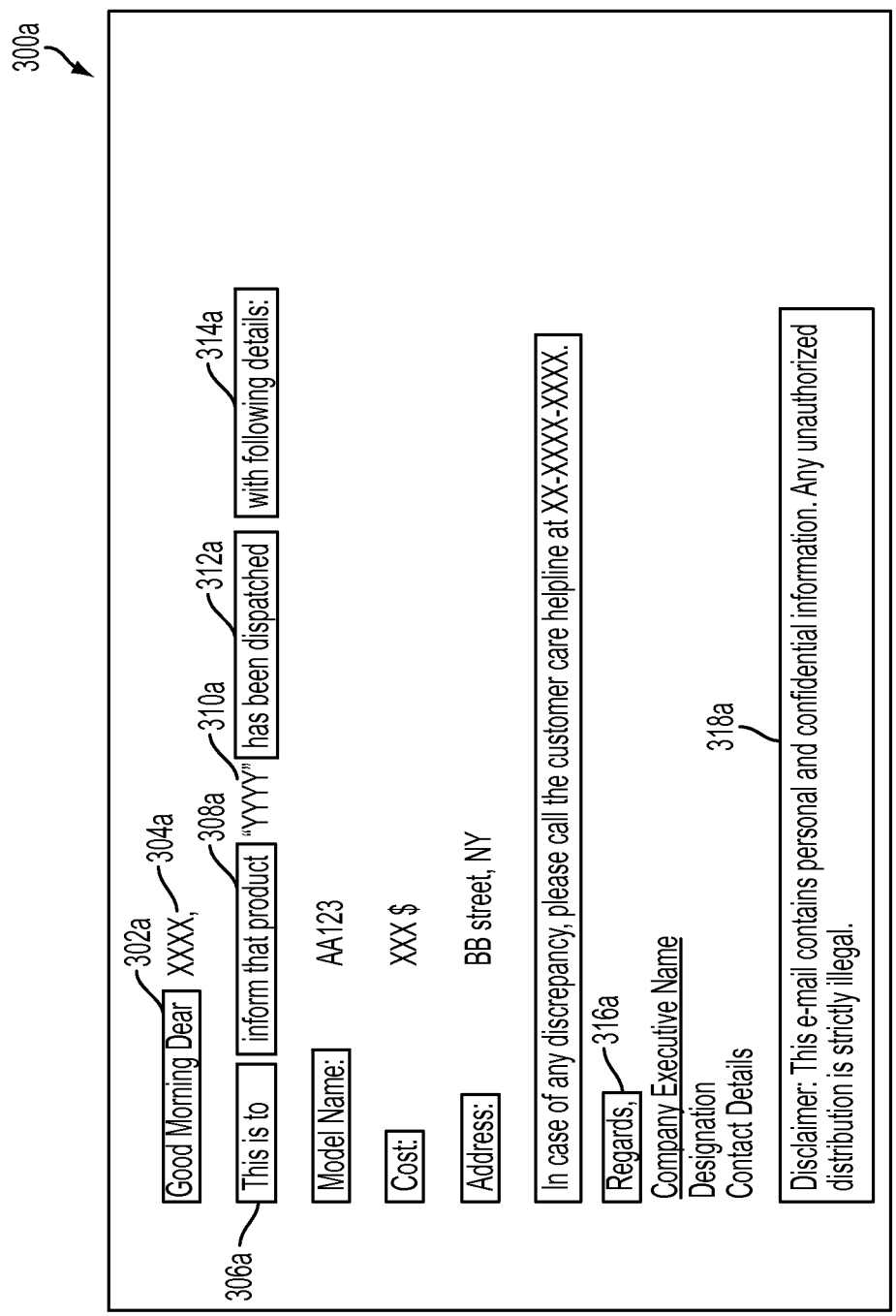
FIG. 3(a) and FIG. 3(b) are snapshots of an example email for detecting boilerplate text, in accordance with at least one embodiment.
Figure 3B:
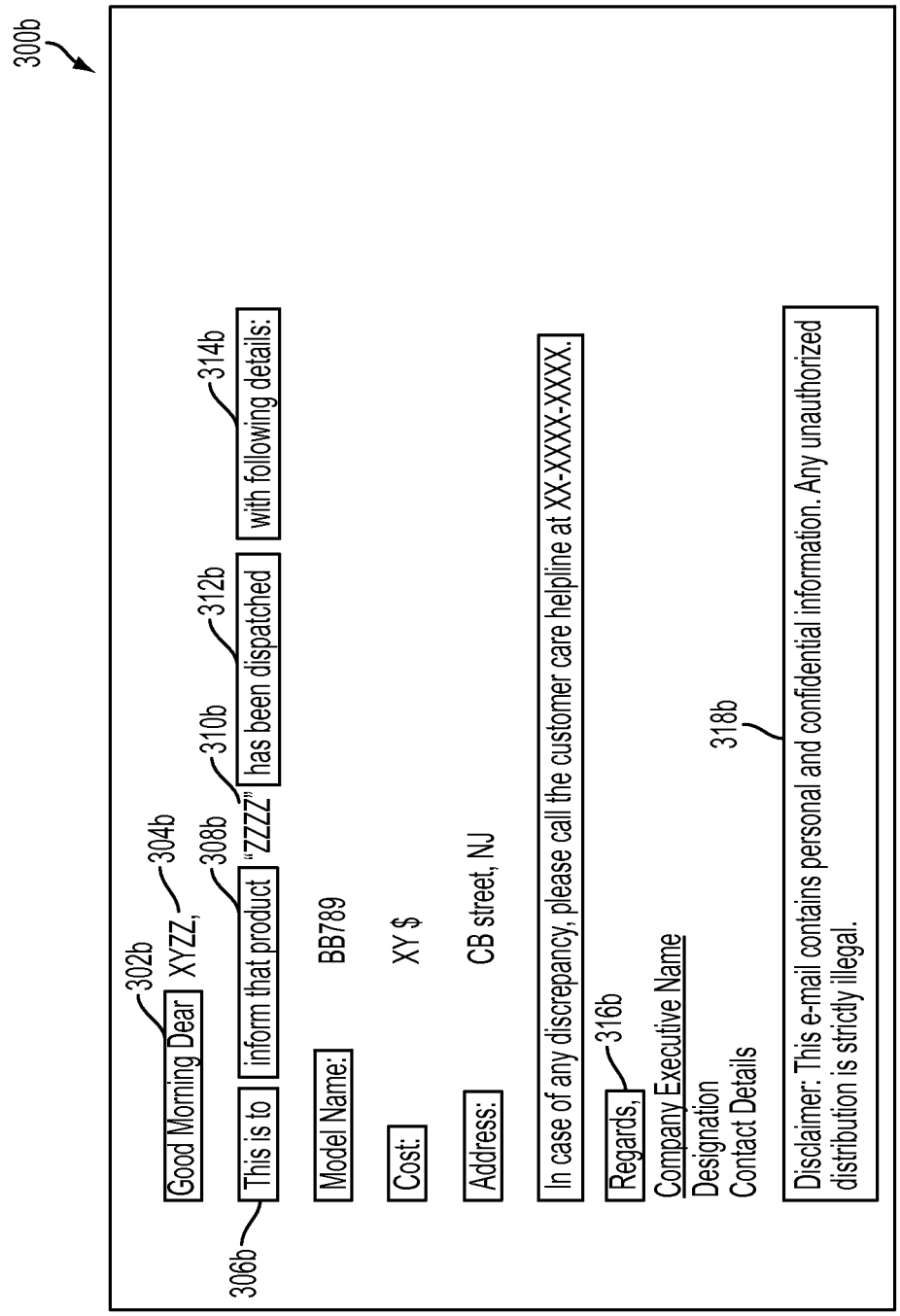

FIG. 3a and FIG. 3b are snapshots of an example email for detecting boilerplate text in accordance with at least one embodiment. FIG. 3 is explained in conjunction with FIG. 1 and FIG. 2.

The motif detection system 110 receives an input as the array of repeats, the first text block 108, and the pre-defined set of parameters from the user 102. In an embodiment, the array of repeats is pre-computed using one or more techniques such as, but not limited to, suffix tree. For email 300a and 300b, an example array of repeats is illustrated below:

[("Good", "Good Morning"), ( ), ( ), ( ), ("This"), ( ), ( ), . . . .]

Array 1: Array of Repeats

From the array of repeats, it can be observed that two repeats occur at position 1, (i.e., "Good" and "Good Morning"). No repeats occur at position 2, position 3, and position 4. At position 5 term "This" is a repeat.

The pre-defined set of parameters constitutes the restrictions applied by the user 102 for outputting the desired one or more text motifs. For detecting boilerplate text in the email 300a and 300b, the pre-defined parameters defined by the user 102 are illustrated below.

TABLE 1

Pre-defined set of parameters

| Parameter | Value defined by user | Example |
|---|---|---|
| d | 3 | "Good Morning Dear" |
| N | 2 | "Good Morning Dear" "This is to" |
| K | 2 | Occurrences of motif in 2 emails |
| $\epsilon$ | 1 | "Good Morning Dear" XXXX, "This is to" |
| $\gamma$ | 5 | "Good Morning Dear This is to inform that product has been dispatched with following details" | where,
d = minimum length of the text block;
N = minimum length of a text motif;
K = minimum number of occurrences of the text motif;
$\epsilon$ = maximum length of a gap between the first text block and the second text block; and
$\gamma$ = maximum number of text blocks in the text motif.

For example, the first text block 108 is "Good Morning Dear" (depicted by 302a and 302b in 300a and 300b, respectively). In an embodiment, the first text block 108 is automatically chosen from the array of repeats. Thereafter, the one or more occurrences of the first text block 108 are detected in the one or more electronic documents 106 as described in step 204 (refer FIG. 2). For instance, the text block "Good Morning Dear" (depicted by 302a) is searched in emails 300a and 300b. Based on the search, it is detected that the text block "Good Morning Dear" (depicted by 302a) is present in the email 300b as 302b.

The motif detection system 110 identifies one or more second text blocks in the vicinity of each of the occurrence of the first text block 108 in each email (i.e., 300a and 300b) based on "ε" and "d". Since d=3 and ε=1 (determined from table 1), text blocks with total number of words greater or equal to three and located at a distance of one word from the first text block 108 are identified. For instance, a text block "This is to" (depicted by 306a) is identified that includes three words (defined by d=3) and is located at distance of one word (i.e., XXXX 304a) from the first text block "Good Morning Dear" (depicted by 302a). Thus, the text block "This is to" (depicted by 306a) is considered as the second text block. In an embodiment, "XXXX" (depicted by 304a) corresponds to joker or don't care symbols.

A check is performed to ascertain whether the second text block (i.e., "This is to" depicted by 306a) occurs in the email 300b in the vicinity of the first text block "Good Morning Dear" (depicted by 302b). Since the second text block "This is to" (306a) is present in the email 300b as 306b, the combination of the first text block 302a and the second text block 306a is considered as a text motif, i.e., "Good Morning Dear This is to".

The text motif is checked for diversity in the email 300a and 300b. The diversity of the one or more text motifs determined must be greater than or equal to the parameter K (i.e., 2). Since the text motif formed by combination of the 302a and 306a is present in email 300b as 302b and 306b, the text motif satisfies the condition mentioned in step 212. Thereafter, the text motif is extracted.

Further, a check is performed to ascertain whether the text motif can be extended by applying γ restriction. Since γ=5, the text motif may include at most five text blocks. As the determined text motif includes the first text block "Good Morning Dear" 302a and the second text block "This is to" 306a, i.e., two text blocks, which is less than γ (i.e., 5). Thus, the text motif may be extended.

As described in step 218 in FIG. 2, if the extension of the one or more text motifs is possible, then the extracted one or more text motifs are taken as a new first text block 108. For example, the determined text motif from the emails 300a and 300b includes two text blocks "Good Morning Dear" (shown by 302a and 302b), and "This is to" (shown by 306a and 306b). The new starting first block 108 for extending the determined motif is taken as "Good Morning Dear This is to". The entire method illustrated in flowchart 200 is repeated until the extension of the text motif satisfies the y restriction.

The same procedure is repeated for all the text blocks in the emails 300a and 300b.

A person having ordinary skill would appreciate that various other types of text motif can be extracted from the email 300a and 300b by varying the predefined set of parameters. For example, for d=1, text motifs "Model Name", "Cost", and "Address" can be extracted from the emails 300a and 300b.

In an embodiment, the one or more text motifs, after the extension, correspond to the boilerplate text. In an embodiment, such boilerplate text may include, but not limited to, digital signatures, disclaimer notices, disclosures, headers/footers, and pre-defined text given by templates. In an embodiment, the one or more text motifs after extension are removed from the email collection to enhance readability. In an alternate embodiment, the one or more text motifs are utilized to generate template 114.

Figure 4:
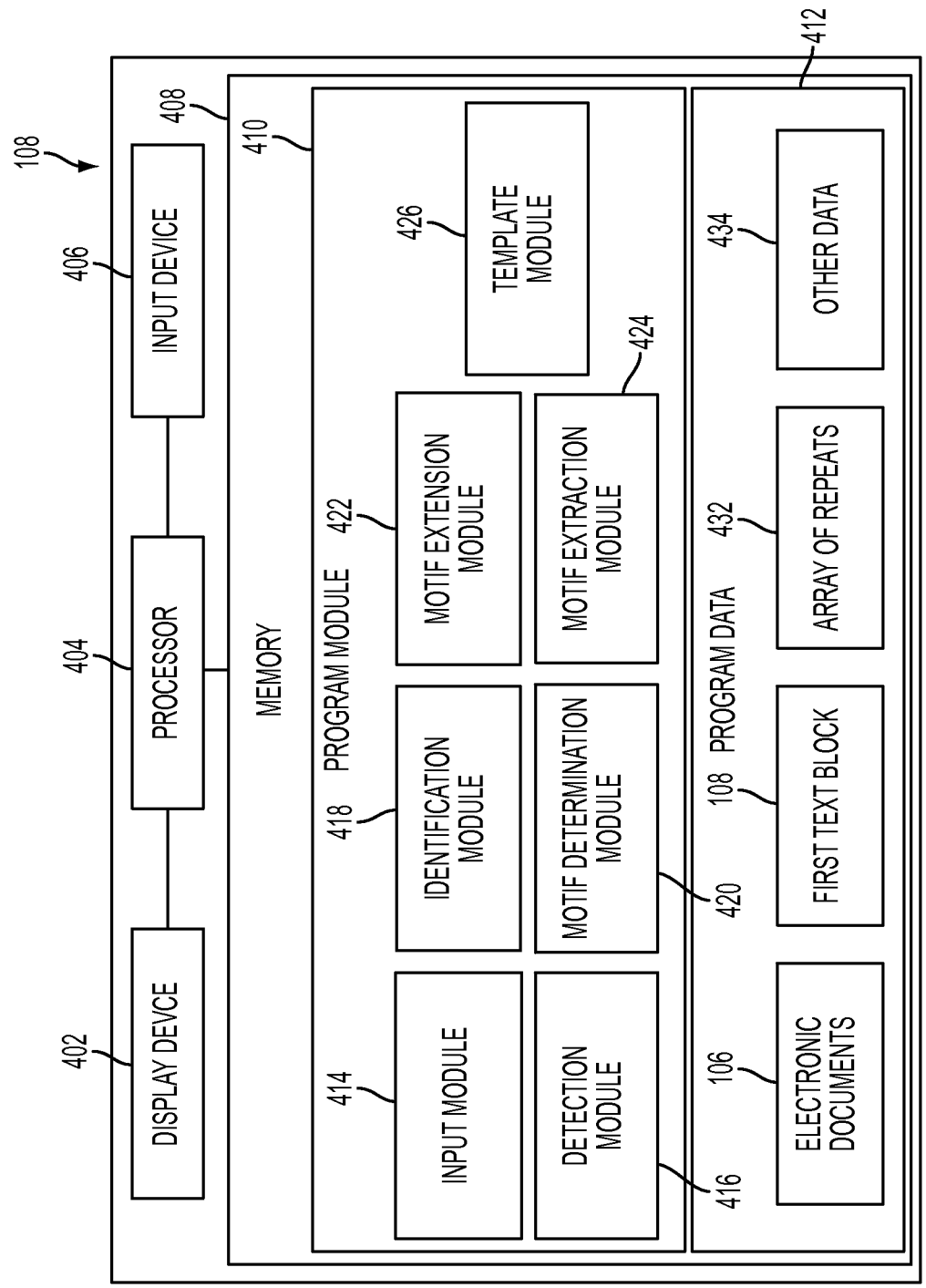
FIG. 4 is a block diagram illustrating a system for motif detection, in accordance with at least one embodiment.

FIG. 4 is a block diagram illustrating a motif detection system 110 in accordance with at least one embodiment. FIG. 4 is explained in conjunction with FIG. 1 and FIG. 2.

The motif detection system 110 includes a display device 402, processor 404, an input device 406, and a memory 408.

The display device 402 facilitates the user 102 to interact with the motif detection system 110. The display device 402 can be realized through several known technologies, such as Cathode Ray Tube (CRT) display, Liquid Crystal Display (LCD), Light Emitting Diode (LED) display, Organic LED display technology, and Retina Display technology. Further, the display device 402 can be a touch-screen capable of receiving user inputs.

The processor 404 is coupled with the display device 402, the input device 406, and the memory 408. The processor 404 executes a set of instructions stored in the memory 408 to perform one or more operations. The processor 404 can be realized through a number of processor technologies known in the art. Examples of the processor 404 include, but are not limited to, an X86 processor, a RISC processor, an ASIC processor, a CISC processor, and an ARM processor.

The input device 406 is configured to receive the input from the user 102. Examples of the input device 406 may include, but are not limited to, a keypad, mouse, joystick, any touch-sensitive medium (e.g., a touch-screen or touch-sensitive pad), voice recognition system, system capable of receiving gestures, video recognition system, and so forth. The input device 406 facilitates the user 102 to input the array of repeats 432, the first text block 108, and the pre-defined set of parameters to the motif detection system 110.

The memory 408 stores a set of instructions and data. Some of the commonly known memory implementations can be, but are not limited to, a Random Access Memory (RAM), a Read Only Memory (ROM), a Hard Disk Drive (HDD), and a secure digital (SD) card. The memory 408 includes a program module 410 and a program data 412. The program module 410 further includes an input module 414, a detection module 416, an identification module 418, a motif determination module 420, a motif extension module 422, a motif extraction module 424, and a template module 426. The program data 412 further includes the electronic documents 106, the first block 108, an array of repeats 432, and other data 434. The program module 410 includes a set of instructions that are executable by the processor 404 to perform specific actions on the computing device 104. It is understood by a person having ordinary skills in the art that the set of instructions are stored in the memory 408 to perform various operations in conjunction with various hardware of the computing device 104.

The input module 414 manages and controls the input device 406 and the display device 402. In an embodiment, the input module 414 includes a driver module for controlling the input device 406 and the display device 402. The input module 414 receives the array of repeats 432, the first text block 108, and the pre-defined set of parameters through the input device 406. Further, the input module 414 stores the array of repeats 432, the first text block 108, and the pre-defined set of parameters as the other data 434.

A detection module 416 detects the one or more occurrences of the first text block 108 in the one or more electronic documents 106, as described in step 204. In an embodiment, the one or more occurrences of the first text block 108 are detected by utilizing the array of repeats 432.

The identification module 418 is configured to identify one or more second text blocks in the vicinity of each of the one or more occurrences of the first text block 108, based on the value of ε as described in step 206. The identification module 418 also checks that at least one of the one or more second text blocks is repeated at least two times in the one or more electronic documents 106.

The motif determination module 420 determines one or more text motifs in the one or more electronic documents 106. In an embodiment, the one or more text motifs is a combination of the first text block 108 and the one or more second text blocks identified by the identification module 418. The determination of the one or more text motifs has been described in conjunction with step 210.

A motif extension module 422 is configured to check if the one or more text motifs can be extended based on the value of $\gamma$.

A motif extraction module 424 extracts the one or more text motifs from the one or more electronic documents 106, post the extension of the one or more text motifs. In an embodiment, the one or more text motifs may include text motifs that do not satisfy the $\gamma$ parameter and cannot be extended. In such cases, the one or more text motifs would be extracted directly without extending the motif extraction module 424.

A template module 426 stores the extracted one or more text motifs. In an embodiment, the template module 426 creates a template 114 by collating all the text motifs extracted by the motif extraction module 424. The template 114 may be created and stored as a separate file. In an embodiment, the one or more text motifs correspond to boilerplate text. The template 114 may be modified with time and with changes in policies in a corporate scenario.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as a floppy-disk drive and optical-disk drive, etc. The storage device may also be a means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or other similar devices, which enable the computer system to connect to databases and networks, such as LAN, MAN, WAN, and the Internet. The computer system facilitates inputs from a user through input device, accessible to the system through an I/O interface.

The computer system executes a set of instructions that are stored in one or more storage elements to process input data. The storage elements may also hold data or other information, as desired. The storage element may be in the form of an information source or a physical memory element present in the processing machine.

The programmable or computer readable instructions may include various commands that instruct the processing machine to perform specific tasks such as, steps that constitute the method of the disclosure. The method and systems described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++', and 'Visual Basic'. Further, the software may be in the form of a collection of separate programs, a program module containing a larger program, or a portion of a program module, as discussed in the ongoing description. The software may also include modular programming in the form of object-oriented programming. The processing of input data by the processing machine may be in response to user commands, results of previous processing, or a request made by another processing machine. The disclosure can also be implemented in various operating systems and platforms including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

The method, system, and computer program product, as described above, have numerous advantages. Some of these advantages may include, but are not limited to, identifying gapped motifs in text, and using a class of maximal repeats, namely, largest-maximal repeats (LMR), as starting blocks, which reduces the execution time and the number of motifs recovered. Moreover, using LMR allows scaling up the methodology of motif extraction to process a dataset ten times bigger in reasonable time. This ensures that the method of motif detection is speedy and efficient. Further, various non-contiguous exact repeats can be identified by the proposed embodiments.

Various embodiments of the method and system for motif extraction in the electronic documents 106 have been disclosed. However, it should be apparent to those skilled in the art that many more modifications, besides those described, are possible without departing from the inventive concepts herein. The embodiments, therefore, are not to be restricted, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create many other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, etc.

The claims can encompass embodiments for hardware, software, or a combination thereof.

It will be appreciated that variants of the above disclosed, and other features and functions or alternatives thereof, may be combined into many other different systems or applications. Various presently unforeseen or unanticipated alternatives, modifications, variations, or improvements therein may be subsequently made by those skilled in the art that are also intended to be encompassed by the following claims.

What is claimed is:

1. A method for extracting one or more text motifs from one or more electronic documents, the method comprising:
   receiving, by a processor, a first text block from a user, wherein the first text block corresponds to at least one of a largest-maximal repeat (LMR) or a super-maximal repeat (SMR);
   receiving, by the processor via an input device coupled to the processor, an array of repeats, wherein the array of repeats comprises a list of repeats of one or more text blocks occurring at one or more positions in the one or more electronic documents;
   detecting, by the processor, one or more occurrences of the first text block in the one or more electronic documents based on the array of repeats;
   identifying, in the one or more electronic documents by the processor, a second text block in vicinity of an occurrence of the first text block based on a pre-defined set of parameters, such that the second text block and the first text block are repeated together at least two times in the one or more electronic documents, wherein the pre-defined set of parameters comprises a maximum number of text blocks in the one or more text motifs;
   determining, by the processor, the one or more text motifs in the one or more electronic documents, wherein each of the one or more text motifs is a combination of the first text block and the second text block;
   checking, by the processor, for extension of the one or more text motifs if a number of text blocks in the one or more text motifs is less than the maximum number of text blocks in the one or more text motifs, wherein the checking for extension further comprises using the one or more text motifs as a new text block and repeating the identifying and determining steps for the new text block until the maximum number of text blocks is reached;
   extracting, by the processor, the one or more text motifs from each of the one or more electronic documents; and
   creating, by the processor, a template by collating the one or more extracted text motifs.

2. The method of claim 1, wherein the one or more electronic documents corresponds to at least one of emails, news articles, journals, or any electronic document containing text.

3. The method of claim 1, wherein the LMR corresponds to a repeat comprising at least one occurrence that is right-context and left-context unique.

4. The method of claim 1, wherein the SMR corresponds to a repeat that is not a substring of any other repeat in the one or more electronic documents.

5. The method of claim 1, wherein the pre-defined set of parameters further comprises at least one of a minimum length of a text block, a minimum length of a text motif, a minimum number of occurrences of the text motif, and a maximum length of a gap between the first text block and the second text block.

6. The method of claim 5 further comprising checking, by the processor, whether the number of occurrences of the text motif in the one or more electronic documents is greater than the minimum number of occurrences of the text motif in the one or more electronic documents, wherein the one or more text motifs are extracted when the number of occurrences of the text motif is greater than the minimum number of occurrences of the text motif.

7. The method of claim 5, wherein the vicinity is determined based on the maximum length of the gap between the first text block and the second text block.

8. A method for removing boilerplate text in one or more electronic documents, the method comprising:
   receiving, by a processor via an input device coupled to the processor, a first text block from a user, wherein the first text block corresponds to at least one of a largest-maximal repeat (LMR) or a super-maximal repeat (SMR);
   receiving, by the processor, an array of repeats, wherein the array of repeats comprises a list of repeats of one or more text blocks occurring at one or more positions in the one or more electronic documents;
   detecting, by the processor, one or more occurrences of the first text block in the one or more electronic documents based on the array of repeats;
   identifying, in the one or more electronic documents by the processor, a second text block in vicinity of an occurrence of the first text block based on a maximum length of a gap between the first text block and the second text block, such that the second text block and the first text block are repeated together, at least two times in the one or more electronic documents;
   determining, by the processor, one or more text motifs in the one or more electronic documents, wherein each of the one or more text motifs is a combination of the first text block and the second text block;
   checking, by the processor, for extension of the one or more text motifs if a number of text blocks in the one or more text motifs is less than a maximum number of text blocks in the one or more text motifs, wherein the checking for extension further comprises using the one or more text motifs as a new text block and repeating the identifying, and determining steps for the new text block until the maximum number of text blocks is reached;
   removing, by the processor, the one or more text motifs from each of the one or more electronic documents; and
   creating, by the processor, a template by collating the one or more extracted text motifs.

9. The method of claim 8 further comprising checking, by the processor, whether the number of occurrences of a text motif is greater than a minimum number of occurrences of the text motif defined by the user, wherein the one or more text motifs is removed if the number of occurrences of the text motif is greater than the minimum number of occurrences of the text motif.

10. A system for extracting one or more text motifs from one or more electronic documents, the system comprising:
    a processor configured to:
    detect one or more occurrences of a first text block in the one or more electronic documents, wherein the first text block corresponds to at least one of a largest-maximal repeat (LMR) or a super-maximal repeat (SMR) based on an array of repeats, wherein the array of repeats comprises a list of repeats of one or more text blocks occurring at one or more positions in the one or more electronic documents, the list of repeats being received at the processor via an input device;

identify, in the one or more electronic documents, a second text block in vicinity of an occurrence of the first text block based on a maximum length of a gap between the first text block and the second text block, such that the second text block and the first text block are repeated together, at least two times in the one or more electronic documents;

determine one or more text motifs in the one or more electronic documents, wherein each of the one or more text motifs is a combination of the first text block and the second text block;

check for extension of the one or more text motifs if a number of text blocks in the one or more text motifs is less than a maximum number of text blocks in the one or more text motifs, wherein the check further comprises using the one or more text motifs as a new text block and repeating the identifying, and determining steps for the new text block until the maximum number of text blocks is reached;

extract the one or more text motifs from each of the one or more electronic documents; and create a template by collating the one or more extracted text motifs.

11. The system of claim 10, wherein the processor is further configured to receive at least one of the first text block, the array of repeats, and a pre-defined set of parameters from a user.

12. The system of claim 10, wherein the processor is further configured to store the extracted one or more text motifs as the template, wherein the extracted one or more text motifs are collated to create the template.

13. A non-transitory computer program product for use with a computer, the non-transitory computer program product comprising a computer readable program code embodied therein for extracting one or more text motifs in a one or more electronic documents, the computer readable program code is executable by a processor to:

receive a first text block from a user via an input device, wherein the first text block corresponds to at least one of a largest-maximal repeat (LMR) or a super-maximal repeat (SMR);

receive an array of repeats via the input device, wherein the array of repeats comprises a list of repeats of one or more text blocks occurring at one or more positions in the one or more electronic documents;

detect one or more occurrences of the first text block in the one or more electronic documents based on the array of repeats;

identify, in the one or more electronic documents, a second text block in vicinity of an occurrence of the first text block based on a pre-defined set of parameters, such that the second text block and the first text block are repeated together in the one or more electronic documents, wherein the pre-defined set of parameters comprises a maximum number of text blocks in the one or more text motifs;

determine the one or more text motifs in the one or more electronic documents, wherein each of the one or more text motifs is a combination of the first text block and the second text block;

check for extension of the one or more text motifs if a number of text blocks in the one or more text motifs is less than the maximum number of text blocks in the one or more text motifs, wherein the checking for extension further comprises using the one or more text motifs as a new text block and repeating the identifying and determining steps for the new text block until the maximum number of text blocks is reached;

extract the one or more text motifs from each of the one or more electronic documents; and create a template by collating the one or more extracted text motifs.

\* \* \* \* \*